(12) United States Patent
Yun

(10) Patent No.: US 6,684,175 B2
(45) Date of Patent: Jan. 27, 2004

(54) DISPLAY METHOD OF AN ALTITUDE DISPLAY APPARATUS FOR DISPLAYING ABSOLUTE ALTITUDE

(75) Inventor: Jong-Tae Yun, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/101,245

(22) Filed: Mar. 18, 2002

(65) Prior Publication Data

US 2003/0023399 A1 Jan. 30, 2003

(30) Foreign Application Priority Data

Jun. 20, 2001 (KR) .................................. 2001-35139

(51) Int. Cl.$^7$ ................................................ G01L 7/12
(52) U.S. Cl. ........................... 702/138; 73/384; 368/11; 701/213; 701/216; 701/113; 702/50; 702/139
(58) Field of Search .............................. 702/50, 98, 138, 702/139; 123/339, 396, 456; 73/384; 701/113, 114, 213, 215; 368/11

(56) References Cited

U.S. PATENT DOCUMENTS

| | | | |
|---|---|---|---|
| 4,835,716 A | * | 5/1989 | Tamaki et al. ............... 702/50 |
| 5,001,929 A | * | 3/1991 | Peet, II ....................... 73/384 |
| 5,113,347 A | * | 5/1992 | Ohuchi et al. ............... 701/113 |
| 5,583,830 A | * | 12/1996 | Okuyama ..................... 368/11 |
| 5,657,232 A | * | 8/1997 | Ishikawa et al. ............. 701/215 |
| 6,519,548 B1 | * | 2/2003 | Kuroda et al. ............... 702/139 |
| 6,529,827 B1 | * | 3/2003 | Beason et al. ............... 701/213 |

OTHER PUBLICATIONS

Heikkinen et al., "Communication handset", Pub. No.: US 2001/0004603 A1, Filed date: Dec. 19, 2000.*

* cited by examiner

*Primary Examiner*—John Barlow
*Assistant Examiner*—John H Le
(74) *Attorney, Agent, or Firm*—Pennie & Edmonds LLP

(57) ABSTRACT

In order to reduce confusion about a displayed absolute altitude and to enhance reliability and correctness, the present invention provides a display method of an altitude display apparatus for displaying an absolute altitude wherein an initial atmospheric pressure is detected, and an absolute altitude is calculated and displayed based on a pressure difference between the initial atmospheric pressure and a current atmospheric pressure if the detected initial atmospheric pressure is larger than a predetermined atmospheric pressure.

10 Claims, 1 Drawing Sheet

DISPLAY METHOD OF AN ALTITUDE DISPLAY APPARATUS FOR DISPLAYING ABSOLUTE ALTITUDE

FIELD OF THE INVENTION

The present invention relates to a display method and apparatus for an altitude display, and more particularly, to a display method and apparatus for measuring and displaying an absolute altitude.

BACKGROUND OF THE INVENTION

In general, a multi-meter is a device for displaying information related to a vehicle driving state, for example, atmospheric pressure, absolute altitude, and driving direction. Such information is useful for a driver of a vehicle, especially for a driver who drives an SUV (Sports Utility Vehicle) that is driven in a variety of driving circumstances.

The multi-meter can function as an altitude display apparatus where a current altitude is displayed, and the current altitude can be displayed as absolute altitude or as relative altitude. Absolute altitude denotes an altitude relative to sea level.

In order to display the absolute altitude, the multi-meter detects an atmospheric pressure with a built-in pressure sensor, and calculates and displays the absolute altitude of a current driving position by comparing the detected atmospheric pressure with an average atmospheric pressure at sea level, which is approximately 1013 hPa (hectopascal).

However, there is a potential problem in this simple method of displaying absolute atmospheric pressure in that the atmospheric pressure not only depends on altitude but also on various factors such as weather and air temperature. As a result, atmospheric pressure at a same location sometimes changes more than 40 hPa according to the season and weather conditions.

Therefore, even for a place of which a real absolute altitude is higher than sea level, sometimes the calculated absolute altitude will show a negative value, which will cause confusion for a driver. Therefore, multi-meters of recently produced vehicles are usually preset to show a value of 0 instead of the calculated negative value.

However, this way of displaying also has a problem. If the pressure sensor produces a signal of 1033 hPa, the multi-meter will initially display "0 m" instead of the calculated "−150 m". In this case, the display of "0 m" will continue until the vehicle goes up in altitude by more than 150 m from the initial altitude because the calculated absolute altitude will remain negative until that time. Therefore the driver will be confused because the multi-meter shows the same value even while the vehicle has moved up by quite a large altitude.

SUMMARY OF THE INVENTION

The present invention provides a display method and altitude display apparatus for displaying an absolute altitude in order to reduce operator confusion about a displayed absolute altitude, and therefore to enhance reliability and correctness of the absolute altitude displayed.

In a preferred embodiment of the present invention, an initial atmospheric pressure is detected, and an absolute altitude is calculated and displayed based on a pressure difference between the initial atmospheric pressure and a current atmospheric pressure if the detected initial atmospheric pressure is larger than a predetermined atmospheric pressure. The initial atmospheric pressure preferably can be detected when the ignition key of a vehicle is transpositioned to an "ON" state, that is, when electric power starts to be supplied to the altitude display apparatus, and the predetermined atmospheric pressure is about an average value of atmospheric pressure at sea level, for example, about 1013 hPa.

For the calculating and displaying the absolute altitude, the current atmospheric pressure is detected while a vehicle equipped with the multi-meter is running, a pressure difference between the current atmospheric pressure and the initial atmospheric pressure is calculated, an altitude difference is calculated based on the calculated pressure difference, and the calculated altitude difference is displayed as the absolute altitude. Preferably, while displaying the calculated altitude difference, a value 0 is displayed when the calculated altitude difference is less than 0.

In a further aspect of the invention an altitude display apparatus comprises a pressure sensor, a control unit and a display unit. The pressure sensor provides pressure signals to the central unit, which calculates the pressure to be displayed and sends appropriate signals to the display unit to generate the display. The control unit is programmed to execute steps for calculating pressure to be displayed as described above.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
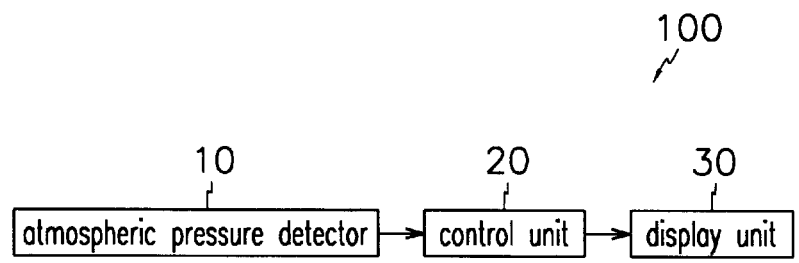
FIG. 1 is a block diagram of an altitude display apparatus according to a preferred embodiment of the present invention.

As shown in FIG. 1, an altitude display apparatus 100 according to a preferred embodiment of the present invention includes an atmospheric pressure detector 10 for detecting an atmospheric pressure, a control unit 20 for calculating an absolute altitude based on a pressure detected by the atmospheric pressure detector 10 and for producing a signal corresponding to the calculated value, and a display unit 30 for displaying the signal input from the control unit 20.

The atmospheric pressure detector 10 can be realized by an ordinary pressure sensor, which may be selected by a person ordinarily skilled in the art of this invention. The control unit 20 preferably includes a microprocessor that is operated by a predetermined program. Further, a detailed description related to the display unit 30 is omitted because it is also readily selected by a person ordinarily skilled in the art.

Figure 2:
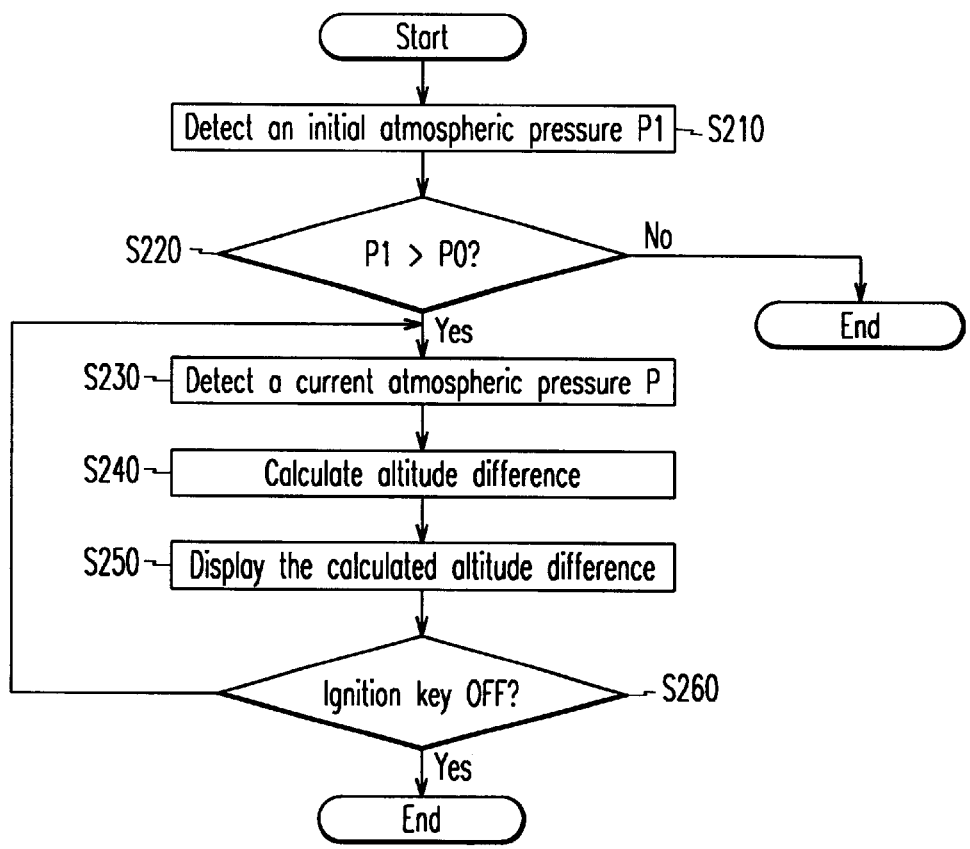
FIG. 2 is a flowchart showing a display method of an altitude display apparatus for displaying an absolute altitude according to a preferred embodiment of the present invention.

As shown in FIG. 2, at step S210, the control unit 20 measures an initial atmospheric pressure P1, that is, an atmospheric pressure when an ignition key is transpositioned to an "ON" position, using the atmospheric pressure detector 10. When a driver turns the ignition key to an "ON" position, electric power starts to be supplied to the altitude display apparatus 100 and the control unit 20 firstly measures the initial atmospheric pressure P1 at S210.

The measured initial atmospheric pressure P1 is compared with a predetermined atmospheric pressure P0, for example, an average atmospheric pressure at sea level (about 1013 hPa). The control unit 20 determines whether the initial atmospheric pressure P1 is greater than the predetermined atmospheric pressure P0 at step S220.

The display method according to this invention terminates if the initial atmospheric pressure P1 is not greater than the predetermined atmospheric pressure P0, and therefore an absolute altitude is displayed according to the prior art.

When the initial atmospheric pressure P1 is greater than the predetermined atmospheric pressure P0, the control unit 20 detects a current atmospheric pressure P at step S230 through the atmospheric pressure detector 10, and calculates an altitude difference based on a pressure difference between the detected current atmospheric pressure P and the initial atmospheric pressure P1 at step S240.

The calculated altitude difference is displayed on the display unit 30 at step S250 by a signal from the control unit 20. The control unit 20 sends a signal corresponding to 0 m to the display unit 30 if the calculated altitude difference is less than 0 m, and otherwise it sends a signal corresponding to the calculated altitude difference.

Table 1 shows a difference between values displayed by the prior art and the preferred embodiment of this invention, when an ignition key of a vehicle is turned on at a place of sea level and the atmospheric pressure is 1033 hPa.

TABLE 1

| | | | | | |
|---|---|---|---|---|---|
| Real absolute altitude (m) | 0 | 50 | 100 | 150 | 200 |
| Detected pressure (hPa) | 1033 | 1026 | 1020 | 1013 | 1006 |
| Value displayed according to the prior art (m) | 0 | 0 | 0 | 0 | 50 |
| Value displayed according to the present invention (m) | 0 | 50 | 100 | 150 | 200 |

As can be seen from the above Table 1, if an atmospheric pressure of 1033 hPa is initially detected, an absolute altitude corresponding to the detected atmospheric pressure is "−150 m", which will be displayed as "0 m" according to a display method of the embodiment of this invention as well as according to the prior art.

However, if the vehicle moves upward to a position where an atmospheric pressure of 1026 hPa is detected, "50 m" corresponding to the pressure difference between 1033 hPa and 1026 hPa is displayed according to this invention whereas "0 m" is still displayed according to the prior art because an absolute altitude corresponding to the detected pressure 1026 hPa is −100 m. Therefore a change of altitude is displayed according to the embodiment of this invention even if the detected atmospheric pressure is higher than the atmospheric pressure of sea level, whereas the change of altitude is not displayed according to the prior art.

The displaying of absolute altitude based on the detected current atmospheric pressure is continued until the ignition key is turned off because the control unit 20 determines whether the ignition key is turned off at step S260 and goes back to step S230 if the ignition key is not turned off.

As shown above, the present invention prevents a driver from being confused by preventing the altitude display apparatus from displaying incorrect information because of changes of atmospheric pressure while a vehicle is stopped at a location, and it enhances reliability and correctness of displaying an absolute altitude.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A display method of an altitude display apparatus for displaying an absolute altitude, comprising:

detecting an initial atmospheric pressure;

determining whether the detected initial atmospheric pressure is above a predetermined atmospheric pressure; and calculating and displaying the absolute altitude based on a pressure difference between the initial atmospheric pressure and a current atmospheric pressure, when the initial atmospheric pressure is above the predetermined atmospheric pressure and, wherein the calculating and displaying the absolute altitude comprises:

detecting the current atmospheric pressure while a vehicle equipped with the altitude display apparatus is running;

calculating an altitude difference based on the pressure difference between the current atmospheric pressure and the initial atmospheric pressure; and displaying the calculated altitude difference as the absolute altitude and wherein said displaying displays 0 when the calculated altitude difference is less than 0.

2. The display method of claim 1, wherein the initial atmospheric pressure is detected when electric power starts to be supplied to the altitude display apparatus.

3. The display method of claim 1, wherein the predetermined atmospheric pressure is about an average value of atmospheric pressure at sea level.

4. An altitude display apparatus comprising:

a pressure sensor;

a control unit configured to receive a pressure signal from the pressure sensor;

a display unit communicating with the control unit to provide a visual pressure display based on pressure signals determined by the control unit, wherein said control unit is programmed to execute the following steps:

detecting an initial atmospheric pressure;

determining whether the detected initial atmospheric pressure is above a predetermined atmospheric pressure; and calculating and displaying the absolute altitude based on a pressure difference between the initial atmospheric pressure and a current atmospheric pressure, when the initial atmospheric pressure is above the predetermined atmospheric pressure and, wherein the calculating and displaying the absolute altitude comprises:

detecting the current atmospheric pressure while a vehicle equipped with the altitude display apparatus is running;

calculating an altitude difference based on the pressure difference between the current atmospheric pressure and the initial atmospheric pressure; and signaling the display unit to display the calculated altitude difference as the absolute altitude and wherein the display unit displays the calculated altitude difference as 0 when the calculated altitude difference is less than 0.

5. The display apparatus of claim 4, wherein control unit signal reads the initial atmospheric pressure when electric power is supplied to the display unit.

6. The display apparatus of claim 4, wherein the predetermined atmospheric pressure is about an average value of atmospheric pressure at sea level.

7. A display method of an altitude display apparatus for displaying an absolute altitude, comprising:

detecting an initial atmospheric pressure, wherein said initial atmospheric pressure is an atmospheric pressure when an ignition key of a vehicle is trans-positioned to an ON position;

determining whether the detected initial atmospheric pressure is above a predetermined atmospheric pressure; and calculating and displaying the absolute altitude based on a pressure difference between the initial atmospheric pressure and a current atmospheric pressure, when the initial atmospheric pressure is above the predetermined atmospheric pressure.

8. The display method of claim 7, wherein the predetermined atmospheric pressure is about an average value of atmospheric pressure at sea level.

9. The display method of claim 7, wherein the calculating and displaying the absolute altitude comprises:

detecting the current atmospheric pressure while a vehicle equipped with the altitude display apparatus is running;

calculating an altitude difference based on the pressure difference between the current atmospheric pressure and the initial atmospheric pressure; and displaying the calculated altitude difference as the absolute altitude.

10. The display method of claim 9, wherein the displaying of the calculated altitude difference displays 0 when the calculated altitude difference is less than 0.

* * * * *